W. P. HARPER.
CULTIVATOR.
APPLICATION FILED NOV. 1, 1915.

1,265,776. Patented May 14, 1918.

Witness
R. E. Hamilton

Inventor
William P. Harper

By Warren D. House
His Attorney

W. P. HARPER.
CULTIVATOR.
APPLICATION FILED NOV. 1, 1915.
1,265,776.
Patented May 14, 1918.
3 SHEETS—SHEET 2.
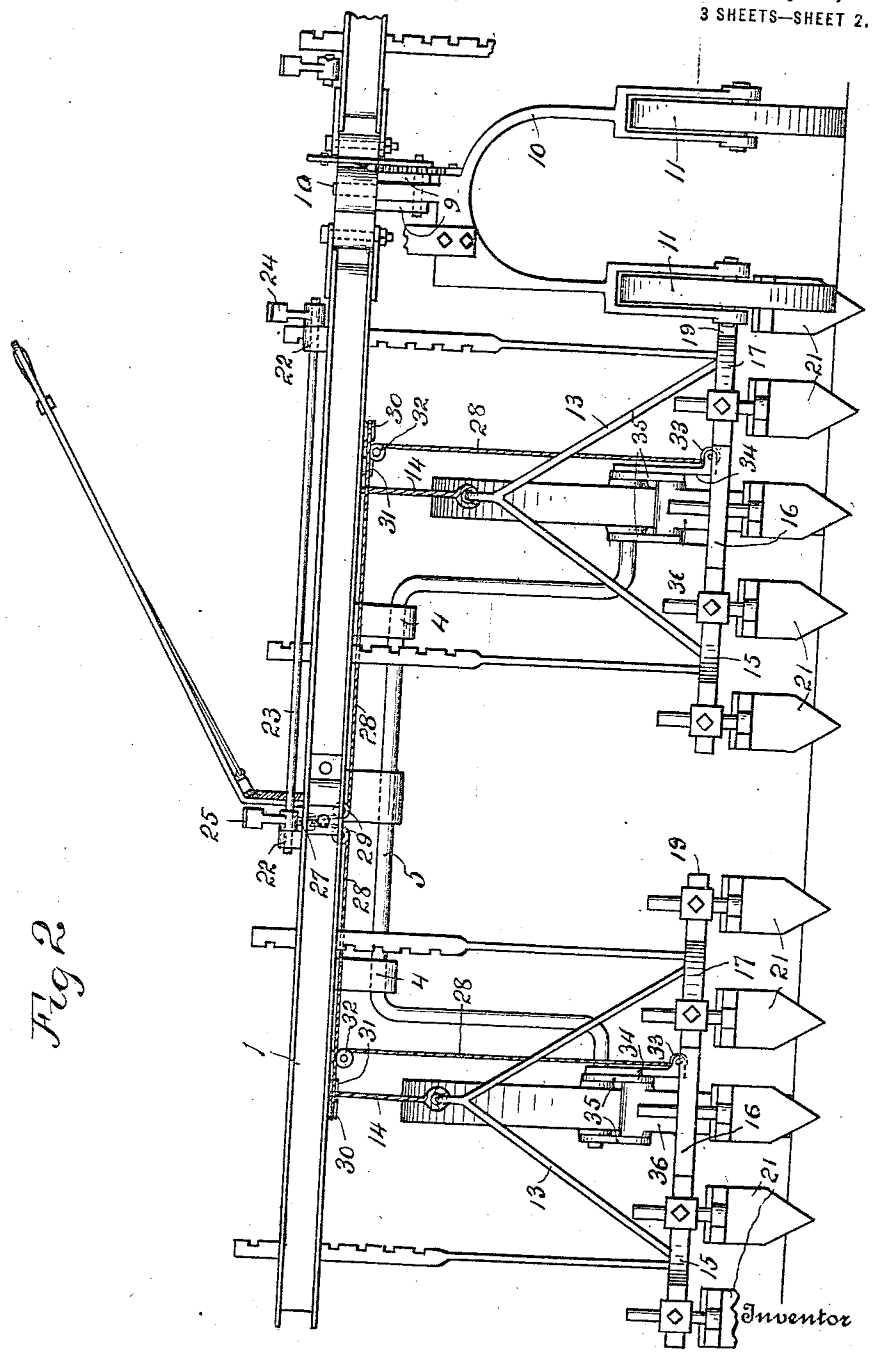
Witness
R. E. Hamilton
William P. Harper
By Warren D. House
His Attorney W. P. HARPER.
CULTIVATOR.
APPLICATION FILED NOV. 1, 1915.
1,265,776.
Patented May 14, 1918.
3 SHEETS—SHEET 3.
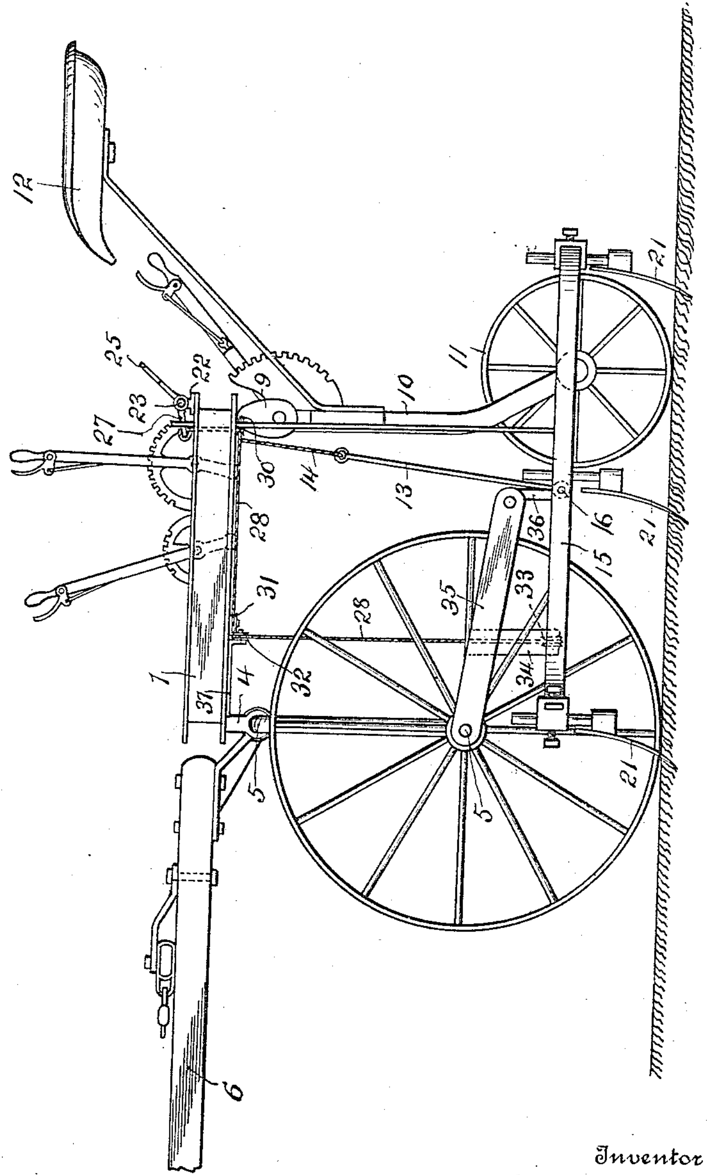
Witness
R. E. Hamilton
Inventor
William P. Harper
By
Warren D. House
His Attorney

UNITED STATES PATENT OFFICE.

WILLIAM P. HARPER, OF ABILENE, KANSAS.

CULTIVATOR.

1,265,776. Specification of Letters Patent. Patented May 14, 1918.

Application filed November 1, 1915. Serial No. 59,026.

*To all whom it may concern:*

Be it known that I, WILLIAM P. HARPER, a citizen of the United States, residing at Abilene, in the county of Dickinson and State of Kansas, have invented certain new and useful Improvements in Cultivators, of which the following is a specification.

My invention relates to improvements in cultivators.

It is an improvement upon the cultivator which was patented by me May 11, 1915, the Letters Patent being numbered 1,139,118.

The object of my present invention is to provide a cultivator of novel construction, so arranged that the operator may swing certain of the shovels, which operate adjacent to the rows of corn or other plants, laterally so as to prevent injury thereby to plants which may happen to be in the line of travel of the swinging shovel.

My invention provides further novel means by which the swinging shovels may be operated by an operator riding upon the frame of the cultivator.

Other novel features of my invention are hereinafter fully described and claimed.

In the accompanying drawing which illustrates the preferred embodiment of my invention, Figure 1 is a plan view of my improved cultivator.

Fig. 2 is an enlarged rear elevation of a portion of the same.

Fig. 3 is a side elevation of the same, a portion of the tongue being broken away.

Similar reference characters designate similar parts in the different views.

1 designates each of two horizontal main frames, preferably flexibly connected together at their adjacent ends by plates 2 and 3 pivoted thereto.

The main frames 1 are respectively pivoted by bearings 4, Figs. 2 and 3, carried thereby to the upper horizontal portions of two arched axles 5 respectively secured to two tongues 6 which carry the usual draft appliances comprising double trees 7, carrying swingle trees 8.

The rear edges of the frames 1 are respectively supported on cams 9 pivotally mounted upon an upright standard 10 having rotatably mounted upon the lower ends of the two arms thereof, two carrying wheels 11. Suitable means is provided for swinging the cams 9 to permit the raising and lowering of the rear sides of the main frames 1.

A driver's seat 12 may be supported by the standard 10.

A plurality of shovel frames are vertically adjustably supported by means of two yokes 13 respectively, said yokes being in turn respectively supported by two cables 14 arranged to be raised and lowered by suitable means carried by the main frames 1, which means is described in my patent aforesaid, but which constitutes no part of my present invention.

Figure 1:
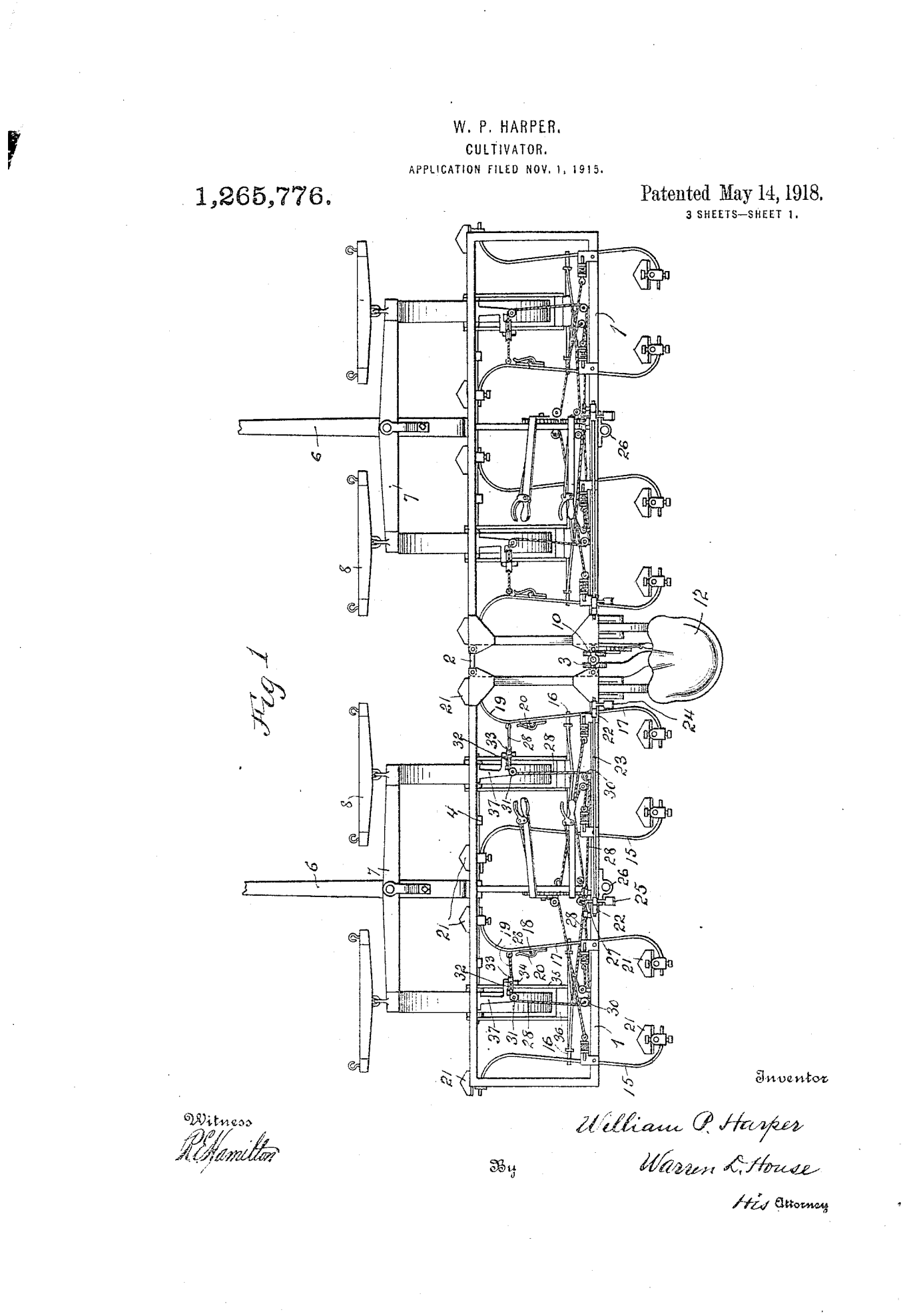

Each shovel frame comprises the following described parts. 15 designates a horizontal longitudinally disposed beam having reversely turned ends, and rigidly secured midway of its length to a transverse bar 16 which is supported by the adjacent yoke 13, and which has rigidly secured to its other end a stationary section 17 of a horizontal longitudinally disposed beam having reversely turned ends. Hinged to the forward end of the section 17 by a hinge 18, having a vertical pintle, is a laterally swinging section 19, which is normally held in the operative position shown in Fig. 1, by a spring 20, which is secured to the stationary section 17.

Shovels 21 are respectively secured to the forward and rear ends of the beams 15 and to the forward and rear ends of the beams composed of the sections 17 and 19.

As the mechanisms for operating the swinging sections 19 carried by the two main frames 1 are similar, a description of one manually operated mechanism will suffice.

Oscillatively mounted in bearings 22 mounted on the main frame 1 is a horizontal transverse rock shaft 23 which has rigidly secured to it adjacent to its ends two pedals 24 and 25, the pedal 24 being located adjacent to the seat 12, so as to be depressible by the foot of the operator, when the seat is disposed intermediate of the two frames 1, as shown in Fig. 1. In case the cultivator be operated with but a single main frame, the seat 12 would be connected thereto adjacent to the middle thereof, in which case the rock shaft 23 would be operated by the pedal 25. In order that this may be done, a socket member 26 is secured to the rear side of each main frame 1 and is adapted to receive the upper end of the standard 10.

The pedal 25 is provided with a forwardly extending arm 27, Fig. 3, to which are connected the upper ends of two cables 28, Fig. 2, which extend downwardly and laterally in opposite directions around two rollers 29 secured to the frame 1. The cables 28 respectively pass over two pulleys 30 supported by the frame 1, and pass forwardly therefrom to and around two rollers 31, from which the cables 28 extend laterally to and downwardly from two rollers 32 respectively to two rollers 33 which are rotatably mounted respectively upon downwardly extending plates 34 which are respectively secured to adjacent links 35, the forward ends of which are pivoted to the axle 5 and the rear ends of which are pivoted to vertical bars 36, which are secured to the transverse bar 16.

The rollers 31 and 32 of each set are mounted on an adjacent bracket 37, Fig. 1, which is secured to the adjacent frame 1.

From the rollers 33, the cables 28 extend and are respectively secured to the swinging sections 19.

In the operation of my invention, when it is desired to swing the beam sections 19, the operator occupying the seat 12 depresses the pedal 24, thereby rocking the rock shaft 23, to which the pedal is connected, thus swinging upwardly the arm 27 and thereby pulling upwardly the cables 28, thus swinging the sections 19 laterally against the tension of the springs 20. When the pedal 24 is released, said springs will retract the sections 19 to the operative position shown in Fig. 1.

By having a flexible cable connection between the arm 27 and the beam sections 19, this connection does not interfere with the raising and lowering of the shovel frame, when such is desired.

I do not limit my invention to the structure shown and described, as modifications, within the scope of the appended claims, may be made without departing from the spirit of my invention.

What I claim is:

1. In a cultivator having a shovel beam comprising two sections, one hinged to the other so as to swing laterally relatively to the other, the combination with said sections, of two shovels secured one to each section, a rock shaft, and means actuated by the rock shaft for swinging laterally the swinging section.

2. In a cultivator having two shovel beams each comprising two sections, one hinged to the other so as to swing laterally relatively to the other, the combination with said sections, of a rock shaft, and means actuated by the rock shaft for swinging laterally simultaneously said swinging sections.

3. In a cultivator having two shovel beams each comprising two sections, one hinged to the other so as to swing laterally relatively to the other, the combination with said sections, of shovels secured one to each section, a rock shaft, and means actuated by the rock shaft for simultaneously swinging laterally said swinging sections.

In testimony whereof I have signed my name to this specification.

WILLIAM P. HARPER.

Copies of this patent may be obtained for five cents each, by addressing the "Commissioner of Patents, Washington, D. C."